United States Patent [19]
Waters

[11] 3,752,034
[45] Aug. 14, 1973

[54] PRACTICE MULTIPLE BOMB RACK

[76] Inventor: John H. Waters, 6240 Holly Bay Dr., Jacksonville, Fla. 32211

[22] Filed: July 23, 1971

[21] Appl. No.: 165,555

[52] U.S. Cl............ 89/1.5 G, 244/137 R, 294/83 R
[51] Int. Cl.............................................. B64d 1/04
[58] Field of Search..................... 89/1.5; 294/83 R; 244/137 R

[56] References Cited
UNITED STATES PATENTS

| | | | |
|---|---|---|---|
| 2,491,400 | 12/1949 | Thumim | 89/1.5 G |
| 2,571,381 | 10/1951 | Potter | 89/1.5 G |
| 2,331,470 | 10/1943 | Hartley | 89/1.5 G |
| 3,494,248 | 2/1970 | Wenger | 80/1.5 R |
| 2,832,632 | 4/1958 | Johnson | 89/1.5 G X |
| 2,869,426 | 1/1959 | Wilkie | 89/1.5 F |
| 2,789,468 | 4/1957 | Burns | 89/1.5 G |

*Primary Examiner*—Samuel W. Engle
*Attorney*—R. S. Sciascia and Thomas O. Watson, Jr.

[57] ABSTRACT

A bomb rack release mechanism having a sear and a rotating solenoid. The sear is pivotally mounted so as to block the movement of the bomb hook when in one position. A linkage couples the sear and solenoid such that actuation of the solenoid acts directly to remove the blocking action of the sear. The release mechanism of the present invention reduces the likelihood of inadvertant bomb release while reducing the time from solenoid actuation to bomb release.

3 Claims, 4 Drawing Figures

Patented Aug. 14, 1973　　　3,752,034

INVENTOR.
JOHN H. WATERS

BY Thomas O. Watson Jr.

ATTORNEY

Patented Aug. 14, 1973  3,752,034

PRACTICE MULTIPLE BOMB RACK

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to bomb racks and more particularly to bomb rack release mechanisms which have an uncomplicated construction and which are able to withstand extreme shock forces and vibration.

Known aircraft bomb racks generally include bell cranks, bars or collapsible toggle links which are subjected to compression when the rack is loaded and, therefor, require sufficient size and thickness to resist deformation. The force required to operate known bomb racks is excessive, particularly for small stores having weights on the order of 5 to 100 pounds. In addition, these bomb racks typically require a two step relatch operation and employ a cocking tool during this operation.

SUMMARY OF THE INVENTION

The present invention provides a simple and efficient release mechanism for use in bomb racks. A rotating solenoid is connected directly to a sear which not only reduces the number of parts necessary but also, reduces the time involved from the initiation of the release signal to the actual store release. The sear is pivotally unbiasedly mounted so as to block the movement of the bomb hook when in one position. Actuation of the solenoid removes the blocking action of the sear thus, causing the bomb hook to pivot and release the bomb. The sear employed in the release mechanism of the present invention is not spring biased toward the release position, as is common in prior art devices. Because the sear is unbiasedly mounted, likelihood of the inadvertant release from spurious electrical impulses or vibrations is greatly reduced.

OBJECTS OF THE INVENTION

An object of the present invention is the provision of an uncomplicated release mechanism for use in bomb racks.

Another object is to provide a bomb rack release mechanism which is less susceptible to external forces.

A further object of the invention is the provision of a bomb rack release mechanism which requires a one step relatch operation.

Still another object is to provide a bomb rack release mechanism having a smaller time from initiation of the release signal to actual store release.

Other objects, advantages, and novel features of the present invention will become apparent from the following detailed description of the invention when considered in conjunction with the accompanying drawings.

DETAILED DESCRIPTION OF THE PREFERRED EMBODIMENT

Figure 1:
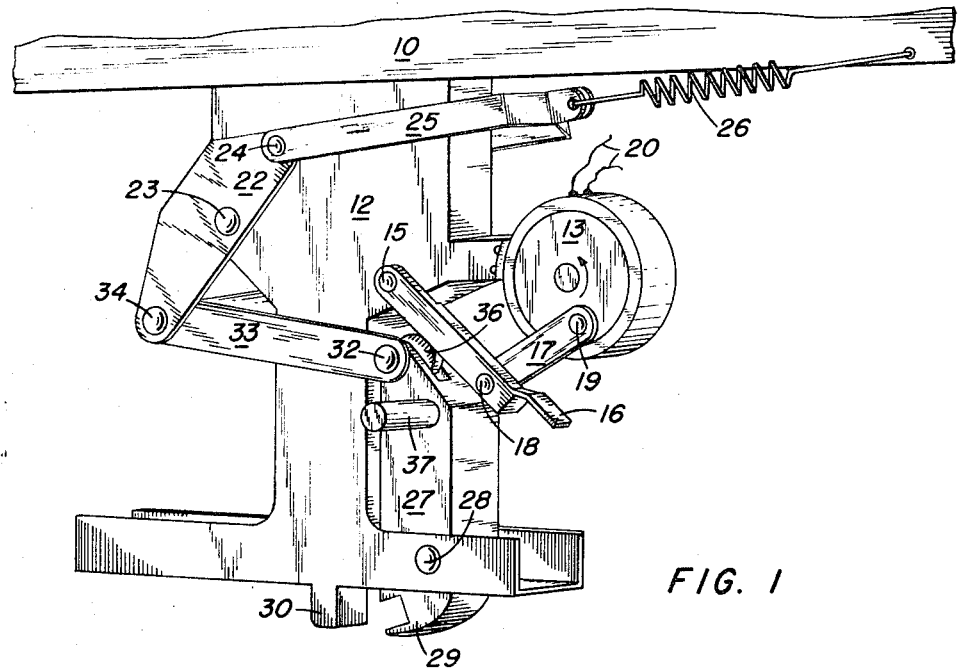
FIG. 1 shows a bomb rack employing a preferred embodiment of the present invention.

FIG. 1, which illustrates a preferred embodiment of the release mechanism of the present invention, shows a bomb rack housing 10 supporting a release mechanism by means of a housing extending member 12. The release mechanism is comprised of a rotating solenoid 13 connected to a sear 14 by means of a linkage 17. The sear 14 is pivotally connected to the extending member 12 by a pin 15. The term connected is used herein to describe structural elements which are physically attached or affixed to one another.

A pivoting member 22 is connected to the extending member 12 opposite the solenoid 13. The pivoting member 22 is connected to the extending member 12 by means of a pin 23. A linkage 25 and spring 26 bias the member 22 in one position while a second linkage 33 connects the member 22 to a bomb release hook 27. The hook 27 is spring biased in the open position through the pivoting member 22, linkages 25 and 33 and the spring 26. At the point of connection between the hook 27 and the linkage 33 there is a roller 36 whose function is more precisely described below.

Figure 2:
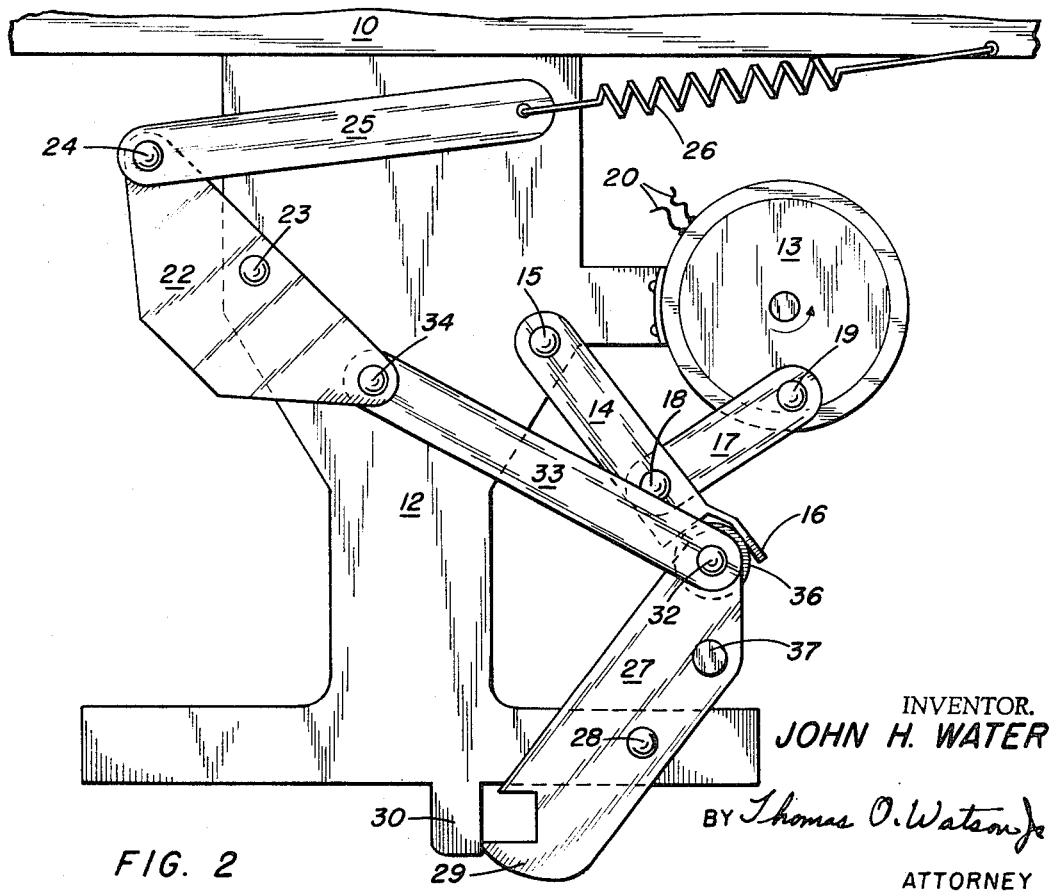
FIG. 2 is a schematic of a preferred embodiment of the present invention in the closed or latched position.

Referring now to FIG. 2, there is shown a schematic of the release mechanism shown in FIG. 1. Like reference numerals are used to designate functionally similar elements. Specifically, there is shown a housing extending portion 12 upon which is mounted a rotating solenoid 13 and a pivoting member 22. The solenoid 13 may be mounted in any known manner; the mounting forming no part of the present invention. The pivoting member 22 is mounted on extending portion 12 by means of a pin 23. The use of the pin 23 allows the pivoting member 22 to pivot relative to the extending portion 12. The pivoting member 22 may be secured on the pin in any known manner, one of which would typically employ the use of a washer and a cotter pin. This same type of securement may be used in any of the "pin" connections described hereinafter.

The pivoting member 22 is biased into one pivoted position by means of a linkage 25 and a spring 26. The spring 26 may be anchored in any convenient location and the connection between the spring 26 and linkage 25 may be made in any known manner. The connection between the linkage 25 and the pivoting member 22 is by means of a pin 24.

On a lower portion of the extending portion 12, a hook 27 is connected to the extending portion 12 by means of a pin 28. The pin 28 is identical to that shown at 23. The lower portion 29 of the hook 27 forms the latching device. When in the position shown in FIG. 2, the lower proportion 29 and the extension 30 of extending member 12 form a closed latch within which a lug on a typical bomb will be securely held. The upper portion of the hook 27 is connected to the pivoting member 22 by means of a linkage 33. The linkage 33 is connected to hook 27 and pivoting member 22 by means of identical pins 32 and 34.

Figure 3:
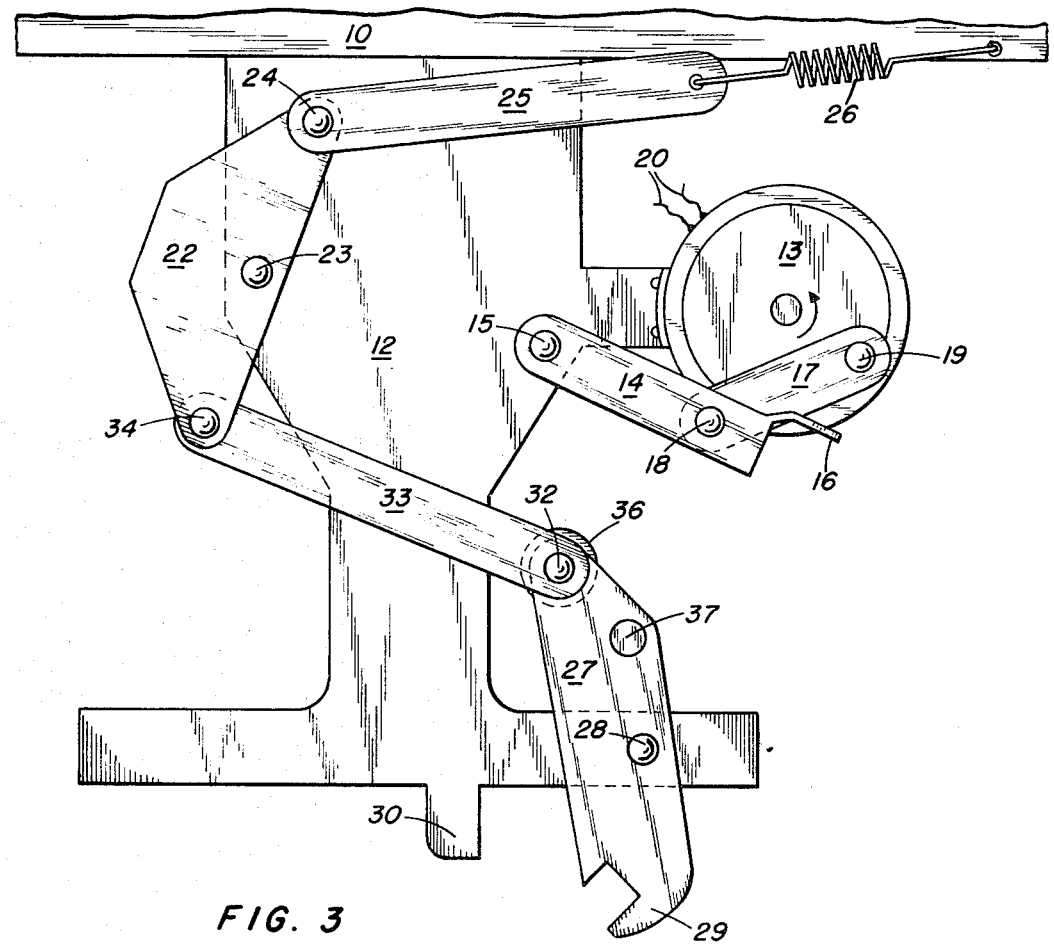
FIG. 3 is a schematic of the preferred embodiment of FIG. 2 in the open or unlatched position.

The action of the spring 26 tends to open the latch device (i.e. to move the hook into the position shown in FIG. 3) However, a sear 14 is provided to maintain the hook 27 in the position shown in FIG. 2. The sear is connected to the extending member 12 by means of a pin connection 15. The sear is allowed to pivot around the connection 15 and the pivoting is controlled by means of the rotating solenoid 13 through a linkage 17. The linkage 17 is connected to the sear 14 and the solenoid 13 by means of pins 18 and 19.

Figure 4:
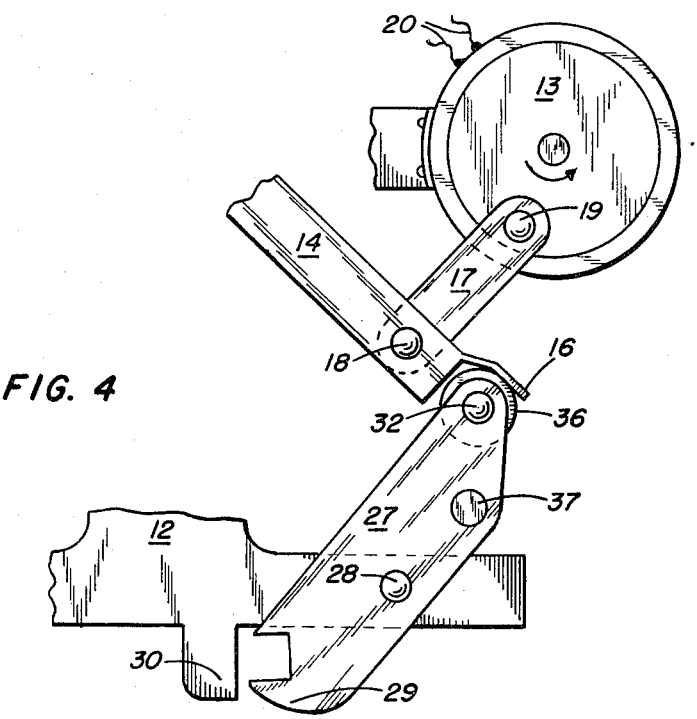
FIG. 4 is a schematic showing some of the elements of the preferred embodiments of FIGS. 2 and 3.

Reference is now made to FIG. 4, where the operation of the sear 14 is more clearly shown. Here, the hook 27 is shown in phantom so as to more clearly show the roller 36 mounted upon the pin 32. As can be seen, when the sear 14 is in the position shown, it prevents movement of the hook 27 to the position shown in FIG. 3. An extension 16 on sear 14 acts to hold the sear 14 in the proper position relative to the roller 36. This is the configuration shown in FIG. 2. When it is desired to release the bomb (i.e. open the latch), the solenoid is energized which acts to remove the sear blocking action through of the linkage 17 acting directly on the sear 14. With the sear thus removed, the force of the spring 26 is allowed to act and snap the release mechanism into the position shown in FIG. 3. To relatch the release mechanism, one simply grasps the pins 37 (one shown) and moves the hook 27 into the position shown in FIG. 2. The sear is then moved manually into its blocking position which also acts to reset the solenoid 13. The release mechanism is now ready for operation.

It can be seen that the release mechanism of the present invention provides an efficient and simple device which is a virtually foolproof. Obviously, many modifications and variations of the present invention are possible in light of the above teachings. It is therefor to be understood that, within the scope of the appended claims, the invention may be practiced otherwise than specifically described.

What is claimed is:

1. A bomb rack release mechanism comprising:
   a housing;
   a hook member pivotally mounted on said housing;
   a spring connected to said housing for constantly biasing said hook member into an open position;
   a first linkage connected to said spring;
   a second linkage pivotally connected to said hook member;
   a pivoting member pivotally mounted on said housing and having one end pivotally connected to said first linkage and another end pivotally connected to said second linkage;
   a sear pivotally mounted on said housing, blocking movement of said hook member into said open position when in a first position and allowing movement of said hook member when in a second position;
   a rotating solenoid mounted on said housing and connected to said sear for moving it from said first position to said second position;
   means connected at one end to said solenoid and at the other end to said sear for moving said sear upon movement of said solenoid; and
   abutment means on said hook member for contacting said sear when in said first position to block movement of the hook member.

2. The release mechanism of claim 1 further including an extending portion on said housing which cooperates with the hook member to form a closed bomb lug securement when the hook member is in a closed position.

3. The release mechanism of claim 1 wherein the sear has an extending portion which acts to properly position the sear relative to said abutment means.

* * * * *